United States Patent
Tarsa et al.

(10) Patent No.: US 10,422,939 B2
(45) Date of Patent: Sep. 24, 2019

(54) WAVEGUIDE HAVING UNIDRECTIONAL ILLUMINANCE

(71) Applicant: CREE, INC., Durham, NC (US)

(72) Inventors: Eric J. Tarsa, Goleta, CA (US); David R. Stone, Northridge, CA (US); Jean-Claude David Ramey de Sugny, Santa Barbara, CA (US)

(73) Assignee: IDEAL INDUSTRIES LIGHTING LLC, Durham, NC (US)

( * ) Notice: Subject to any disclaimer, the term of this patent is extended or adjusted under 35 U.S.C. 154(b) by 57 days.

(21) Appl. No.: 15/277,670

(22) Filed: Sep. 27, 2016

(65) Prior Publication Data

US 2017/0131452 A1    May 11, 2017

Related U.S. Application Data

(63) Continuation of application No. 14/472,078, filed on Aug. 28, 2014, now abandoned, and a
(Continued)

(51) Int. Cl.
*F21V 8/00* (2006.01)
*F21S 8/04* (2006.01)
(Continued)

(52) U.S. Cl.
CPC ............... *G02B 6/005* (2013.01); *F21S 8/04* (2013.01); *G02B 6/003* (2013.01); *G02B 6/0016* (2013.01);
(Continued)

(58) Field of Classification Search
CPC ... F21S 43/40; F21V 5/02; F21V 5/04; G02B 5/045; G02B 6/0011; G02B 6/0016; G02B 6/0021; G02B 6/003; G02B 6/0036; G02B 6/005; G02B 6/0053; G02B 6/0065; G02B 6/0035; G02F 1/133606; G02F 1/133615; G02F 2001/133607; G09F 13/18;
(Continued)

(56) References Cited

U.S. PATENT DOCUMENTS 5,027,258 A * 6/1991 Schoniger ............ G02B 6/0023
362/629
5,462,700 A * 10/1995 Beeson ............ B29D 11/00663
264/1.27
(Continued)

FOREIGN PATENT DOCUMENTS

WO    WO-2011030284 A1 * 3/2011 ............... E06B 9/24

OTHER PUBLICATIONS

International Preliminary Report on Patentability dated Jan. 12, 2017, for International Application No. PCT/US2015/032040, filed May 21, 2015, Applicant, Cree, Inc. (7 pages).
(Continued)

*Primary Examiner* — Alexander K Garlen
(74) *Attorney, Agent, or Firm* — Coats & Bennett, PLLC

(57) ABSTRACT

A luminaire includes an optical waveguide having a first surface and a second surface opposite the first surface, and a light source associated with the optical waveguide. At least about 80% of light produced by the light source is directed by the waveguide into an illumination distribution emitted from the first surface of the optical waveguide.

19 Claims, 14 Drawing Sheets

Related U.S. Application Data continuation-in-part of application No. 14/101,129, filed on Dec. 9, 2013, now Pat. No. 10,234,616, said application No. 14/472,078 is a continuation-in-part of application No. 14/101,051, filed on Dec. 9, 2013, now Pat. No. 9,366,396, application No. 15/277,670, filed on Sep. 27, 2016, which is a continuation-in-part of application No. PCT/US2014/013937, filed on Jan. 30, 2014, and a continuation-in-part of application No. PCT/US2014/013931, filed on Jan. 30, 2014, and a continuation-in-part of application No. 14/472,064, filed on Aug. 28, 2014, now Pat. No. 10,209,429, and a continuation-in-part of application No. 14/472,035, filed on Aug. 28, 2014, now Pat. No. 9,645,303, application No. 15/277,670, which is a continuation of application No. 14/472,078, filed on Aug. 28, 2014, now abandoned, and a continuation-in-part of application No. 13/839,949, filed on Mar. 15, 2013, now Pat. No. 9,581,751, said application No. 14/472,078 is a continuation-in-part of application No. 13/938,877, filed on Jul. 10, 2013, now Pat. No. 9,389,367, application No. 15/277,670, which is a continuation-in-part of application No. 14/101,086, filed on Dec. 9, 2013, now Pat. No. 9,690,029, and a continuation-in-part of application No. 13/840,563, filed on Mar. 15, 2013, said application No. 14/472,078 is a continuation-in-part of application No. 14/101,132, filed on Dec. 9, 2013, now Pat. No. 9,442,243, application No. 15/277,670, which is a continuation-in-part of application No. 14/101,147, filed on Dec. 9, 2013, now Pat. No. 9,869,432.

(60) Provisional application No. 61/922,017, filed on Dec. 30, 2013, provisional application No. 62/020,866, filed on Jul. 3, 2014.

(51) Int. Cl.
*F21Y 103/10* (2016.01)
*F21Y 115/10* (2016.01)
*G09F 13/18* (2006.01)

(52) U.S. Cl.
CPC ......... *G02B 6/0021* (2013.01); *G02B 6/0036* (2013.01); *G02B 6/0053* (2013.01); *G02B 6/0073* (2013.01); *G02B 6/0083* (2013.01); *G09F 13/18* (2013.01); *F21Y 2103/10* (2016.08); *F21Y 2115/10* (2016.08); *G02B 6/0068* (2013.01); *G02B 6/0093* (2013.01); *G09F 2013/1827* (2013.01)

(58) Field of Classification Search
CPC ..... G09F 2013/1804; G09F 2013/1813; G09F 2013/1827
See application file for complete search history.

(56) References Cited

U.S. PATENT DOCUMENTS

| | | | | |
|---|---|---|---|---|
| 5,499,165 | A * | 3/1996 | Holmes, Jr. | G02B 6/0031 362/256 |
| 5,671,994 | A * | 9/1997 | Tai | F21V 5/02 362/23.15 |
| 6,294,983 | B1 * | 9/2001 | Lee | G02B 6/0068 340/332 |
| 7,001,060 | B1 | 2/2006 | Kimura | |
| 7,780,329 | B2 * | 8/2010 | McCollum | F21V 5/00 362/606 |
| 7,967,492 | B2 * | 6/2011 | Nagasawa | G02B 5/021 362/606 |
| 8,231,257 | B2 * | 7/2012 | Griffiths | G02B 6/0036 362/558 |
| 8,284,346 | B2 * | 10/2012 | Park | G02B 5/02 349/62 |
| 8,328,403 | B1 * | 12/2012 | Morgan | G02B 6/26 362/606 |
| 9,329,326 | B2 * | 5/2016 | Marttila | B29D 11/00663 |
| 2007/0223252 | A1 * | 9/2007 | Lee | G02B 6/0053 362/615 |
| 2007/0279933 | A1 * | 12/2007 | Shiau | G02B 6/0053 362/606 |
| 2008/0285304 | A1 * | 11/2008 | Rankin, Jr. | G02B 6/0036 362/602 |
| 2009/0091949 | A1 * | 4/2009 | Lee | G02B 6/0036 362/620 |
| 2010/0060817 | A1 * | 3/2010 | Park | G02B 5/02 349/64 |
| 2010/0097809 | A1 * | 4/2010 | Munro | F21V 5/04 362/308 |
| 2013/0093980 | A1 * | 4/2013 | Goto | G02B 6/0038 349/65 |

OTHER PUBLICATIONS

European Patent Office Communication dated Jul. 6, 2016, European Patent Application No. 14192325.0/1562, filed Jul. 11, 2014, Applicant, Cree, Inc. (4 pages).

\* cited by examiner

WAVEGUIDE HAVING UNIDRECTIONAL ILLUMINANCE

CROSS REFERENCE TO RELATED APPLICATIONS

The present application is a continuation of U.S. patent application Ser. No. 14/472,078 filed on Aug. 28, 2014, entitled "Waveguide Having Unidirectional Illuminance", which claims the benefit of U.S. Provisional Patent Application No. 61/922,017, filed Dec. 30, 2013, entitled "Optical Waveguide Bodies and Luminaires Utilizing Same" and U.S. Provisional Patent Application No. 62/020,866, filed Jul. 3, 2014, entitled "Luminaires Utilizing Edge Coupling", and the non-provisional U.S. patent application Ser. No. 14/472,078 filed on Aug. 28, 2014, entitled "Waveguide Having Unidirectional Illuminance" further comprises a continuation-in-part of U.S. patent application Ser. No. 13/938,877, filed Jul. 10, 2013, entitled "Optical Waveguide and Luminaire Incorporating Same", and further comprises a continuation-in-part of U.S. patent application Ser. No. 14/101,132, filed Dec. 9, 2013, entitled "Waveguide Bodies Including Redirection Features and Methods of Producing Same", and further comprises a continuation-in-part of U.S. patent application Ser. No. 14/101,051, filed Dec. 9, 2013, entitled "Optical Waveguide and Lamp Including Same", all owned by the assignee of the present application, and the disclosures of which are incorporated by reference herein. The present application comprises a continuation of U.S. patent application Ser. No. 14/472,078 filed on Aug. 28, 2014, entitled "Waveguide Having Unidirectional Illuminance", and further comprises a continuation-in-part of U.S. patent application Ser. No. 13/839,949, filed Mar. 15, 2013, entitled "Optical Waveguide and Lamp Including Same", and further comprises a continuation-in-part of U.S. patent application Ser. No. 13/840,563, filed Mar. 15, 2013, entitled "Optical Waveguide and Luminaire Incorporating Same", and further comprises a continuation-in-part of U.S. patent application Ser. No. 14/101,086, filed Dec. 9, 2013, entitled "Optical Waveguides and Luminaires Incorporating Same", and further comprises a continuation-in-part of U.S. patent application Ser. No. 14/101,147, filed Dec. 9, 2013, entitled "Luminaires Using Waveguide Bodies and Optical Elements", and further comprises a continuation-in-part of U.S. patent application Ser. No. 14/101,129, filed Dec. 9, 2013, entitled "Simplified Low Profile Module With Light Guide For Pendant, Surface Mount, Wall Mount and Stand Alone Luminaires", and further comprises a continuation-in-part of International Application No. PCT/US14/13937, filed Jan. 30, 2014, entitled "Optical Waveguide Bodies and Luminaires Utilizing Same", and further comprises a continuation-in-part of International Application No. PCT/US14/13931, filed Jan. 30, 2014, entitled "Optical Waveguides and Luminaires Incorporating Same", and further comprises a continuation-in-part of U.S. patent application Ser. No. 14/472,064, entitled "Luminaire with Selectable Luminous Intensity Pattern", filed Aug. 28, 2014, and U.S. patent application Ser. No. 14/472,035, entitled "Luminaires Utilizing Edge Coupling", filed Aug. 28, 2014, all owned by the assignee of the present application, and the disclosures of which are incorporated by reference herein.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to lighting devices, and more particularly, to a luminaire incorporating waveguides for general illumination.

BACKGROUND

An optical waveguide mixes and directs light emitted by one or more light sources, such as one or more light emitting diodes (LED elements). A typical optical waveguide includes three main components: one or more coupling surfaces or elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling element, the primary considerations are: maximizing the efficiency of light transfer from the source into the waveguide; controlling the location of light injected into the waveguide; and controlling the angular distribution of the light in the waveguide. The coupling element of a waveguide may be comprised of one or more of a number of optical elements, including a 'primary' source optic (such as the lens on an LED component package), one or more intermediate optical elements (such as a lens or array of lenses) interposed between the source and the waveguide coupling surface or surfaces, one or more reflective or scattering surfaces surrounding the sources, and specific optical geometries formed in the waveguide coupling surfaces themselves. Proper design of the elements that comprise the coupling element can provide control over the spatial and angular spread of light within the waveguide (and thus how the light interacts with the extraction elements), maximize the coupling efficiency of light into the waveguide, and improve the mixing of light from various sources within the waveguide (which is particularly important when the color from the sources varies—either by design or due to normal bin-to-bin variation in lighting components). The elements of the waveguide coupling system can use reflection, refraction, total internal reflection, and surface or volume scattering to control the distribution of light injected into the waveguide.

To increase the coupling of light from a light source into a waveguide, it is desirable to maximize the number of light rays emitted by the source(s) that impinge directly upon the waveguide coupling surface. Light rays that are not directly incident on the waveguide from the source must undergo one or more reflections or scattering events prior to reaching the waveguide coupling surface. Each such ray is thus subject to absorption at each reflection or scattering event, leading to light loss and inefficiencies. Further, each ray that is incident on the coupling surface has a portion that is reflected (Fresnel reflection) and a portion that is transmitted into the waveguide. The percentage that is reflected is smallest when the ray strikes the coupling surface at an angle of incidence relative to the surface normal close to zero (i.e., approximately normal to the surface). The percentage that is reflected is largest when the ray is incident at a large angle relative to the surface normal of the coupling surface (i.e., approximately parallel to the surface). To increase efficiency, the coupling of the light into the waveguide body minimizes the absorbing of light at reflection or scattering events as well as the Fresnel reflection at the coupling surface.

In conventional coupling, a light source, typically emitting a Lambertian distribution of light, is positioned adjacent to the edge of a planar waveguide element. The amount of light that directly strikes the coupling surface of the waveguide in this case is limited due to the wide angular distribution of the source and the relatively small solid angle represented by the adjacent planar surface. To increase the amount of light that directly strikes the coupling surface, a bare component such as the Cree ML-series or MK-series (manufactured and sold by Cree, Inc. of Durham, N.C., the assignee of the present application) may be used. A bare component is a light source that does not include a primary optic, lens, or discrete coupling optic formed about an LED chip. The flat emitting surface of the LED chip may be placed in close proximity to the coupling surface of the waveguide. While this arrangement helps ensure a large portion of the emitted light is directly incident on the waveguide, overall system efficiency generally suffers as bare components are typically less efficient than components having primary lenses, which facilitate light extraction from the component, improving overall efficiency.

As discussed above, the use of higher-efficiency LED elements having conventional (e.g., predominantly hemispherical or cubic) primary optics results in a limited amount of light that is directly incident on the coupling surface of the waveguide. Such light source(s) are often placed in a reflective channel or cavity to reflect light onto the coupling surface, thereby increasing the amount of light from the source that reaches the waveguide but also reducing overall system efficiency due to the loss incurred at each reflection event. In some luminaires, the waveguide(s) may have coupling surfaces specifically shaped to maximize the amount of light captured at the coupling surfaces. Alternatively, each LED may be positioned in a cylindrical coupling cavity within the waveguide, and a reflective cap having a cone-shaped plug diverter may be placed at the opposite end of the coupling cavity.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflection, light traveling through a waveguide is reflected back into the waveguide from an outer surface thereof, provided that the incident light does not exceed a critical angle with respect to the surface. Specifically, the light rays continue to travel through the waveguide until such rays strike an index interface surface at a particular angle less than an angle measured with respect to a line normal to the surface point at which the light rays are incident (or, equivalently, until the light rays exceed an angle measured with respect to a line tangent to the surface point at which the light rays are incident) and the light rays escape.

In order for an extraction element to remove light from the waveguide, the light must first contact the feature comprising the element. By appropriately shaping the waveguide surfaces, one can control the flow of light across the extraction feature(s) and thus influence both the position from which light is emitted and the angular distribution of the emitted light. Specifically, the design of the coupling and distribution surfaces, in combination with the spacing (distribution), shape, and other characteristic(s) of the extraction features provides control over the appearance of the waveguide (luminance), its resulting angular distribution of emitted light (illuminance), and system optical efficiency.

In designing waveguide/extractor lighting systems, an important consideration is the purpose and/or positioning of the luminaire relative to the viewer and the illuminated surfaces. For example, in general illumination systems such as troffer lighting, the light source or luminaire is typically located on or near the ceiling and provides illumination to the walls and floor of a room. In this case, it is desirable for the luminaire to provide light in useful directions (e.g., towards the surfaces to be illuminated), and the 'viewer' or room occupant will typically be able to directly view the light emitting surfaces such that glare may become an issue if too much light is provided into a particular viewing angle from a sufficiently small emitting area. While low luminaire cost and architectural designs may call for smaller light-emitting surfaces, the requirement for limiting glare will typically place a lower limit on luminaire size and/or require architectural features such as recessing lighting to achieve the desired level of lighting. Alternately, conventional work or task lighting provides a light source that is necessarily offset from the observer's line of sight to prevent the light source from obscuring the object being viewed (e.g., a ring of lights around a microscope lens or a head light mounted above or to the side of a viewer's head). The light of such work lighting is angled toward the viewer's line of sight but is not in line with his/her sight. This offset lighting creates shadows and prevents a viewer from observing certain surfaces, such as the interior of narrow openings. Further, conventional work lighting also typically requires a large amount of light emitted from a necessarily small source, making the light source extremely visible and creating bright points or glare along the exiting surface of the work light as well as from reflections of the work light from shiny or reflective work surfaces.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light-emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED components directed into the edge of a waveguiding element (an 'edge-lit' approach). However, such luminaires typically suffer from low efficiency due to losses inherent in coupling light emitted from a predominantly Lambertian emitting source such as a LED component into the narrow edge of a waveguide plane.

Beeson et al. U.S. Pat. No. 5,396,350 teaches a backlighting apparatus used for flat panel electronic displays. The apparatus includes a slab waveguide that receives light from a light source positioned adjacent a side surface thereof and an array of microprisms attached to a face of the waveguide. Each microprism has a side surface tilted at an angle from the direction normal to the surface of the waveguide. Light emitted from the microprisms is substantially perpendicular to the slab waveguide.

Zimmerman et al. U.S. Pat. No. 5,598,281 discloses a backlight assembly for electro-optical displays. Light emitted from a light source disposed within a reflector travels through an array of apertures and is collimated by an array of tapered optical elements aligned with the array of apertures. Microlenses may be disposed adjacent the optical elements to further collimate the light. The surfaces of the optical elements are planar or parabolic in shape.

Zimmerman et al. U.S. Pat. No. 5,428,468 teaches an optical illumination system for applications that require substantially collimated light. The system comprises a waveguide that receives light from an edge thereof. An array of microprisms is attached to one face of the waveguide. Each microprism has at least two sidewalls tilted at an angle from the normal of the surface of the waveguide. An array of microlenses may be disposed atop the array of microprisms to further collimate the light.

Steiner et al. U.S. Pat. No. 5,949,933 discloses an optical illumination system for collimating light. The system includes a waveguide that receives light from an edge thereof and an array of lenticular microprisms attached to one face of the waveguide. Each microprism has a light input surface optically coupled to the waveguide and a light output surface opposite the input surface. The light input surface includes a number of tapered grooves perpendicular to the length of the lenticular microprism. The system also includes an array of microlenses to further collimate the light.

Hou et al. U.S. Pat. No. 5,839,823 teaches an illumination system including a light source adjacent to or housed within a reflector. A light-directing assembly having at least one microprism carried on a base wall is positioned adjacent the light source opposite the reflector. The microprism may be polyhedronal, curvilinear, and polyhedronal curvilinear. A lens array may be disposed on the other side of the base wall.

Kuper et al. U.S. Pat. No. 5,761,355 discloses a light directing optical structure comprising a waveguide having a multiplicity of prisms attached thereto. Light redirected by the prisms is constrained to a range of angles. The side face(s) of the prisms may be planar or curved. An array of lenses may be used to spread the light output of the prisms to a wider distribution angle

SUMMARY

According to one aspect, a luminaire includes an optical waveguide having a first surface and a second surface opposite the first surface, and a light source associated with the optical waveguide. At least about 80% of light produced by the light source is directed by the waveguide into an illumination distribution emitted from the first surface of the optical waveguide.

According to another aspect, a luminaire includes a waveguide having a first surface and a second surface opposite the first surface. The waveguide includes an extraction feature disposed on the first surface. The luminaire further includes a light source associated with the waveguide. Light emitted from the light source is directed by the waveguide into an illumination distribution emitted from the first surface of the waveguide. Further, the waveguide is optically transparent such that the illumination distribution is visible along a line of sight through the waveguide extending from the second surface to the first surface.

According to a further aspect, a luminaire includes a housing, an LED element disposed within the housing, and a waveguide having a light emitting surface disposed in the housing adjacent the LED element. An extraction feature is disposed on the light emitting surface of the waveguide. The extraction feature has a curved shape extending between an aperture adjacent the light emitting surface and a base opposite the aperture.

Other aspects and advantages will become apparent upon consideration of the following detailed description and the attached drawings.

DETAILED DESCRIPTION

Figure 1:
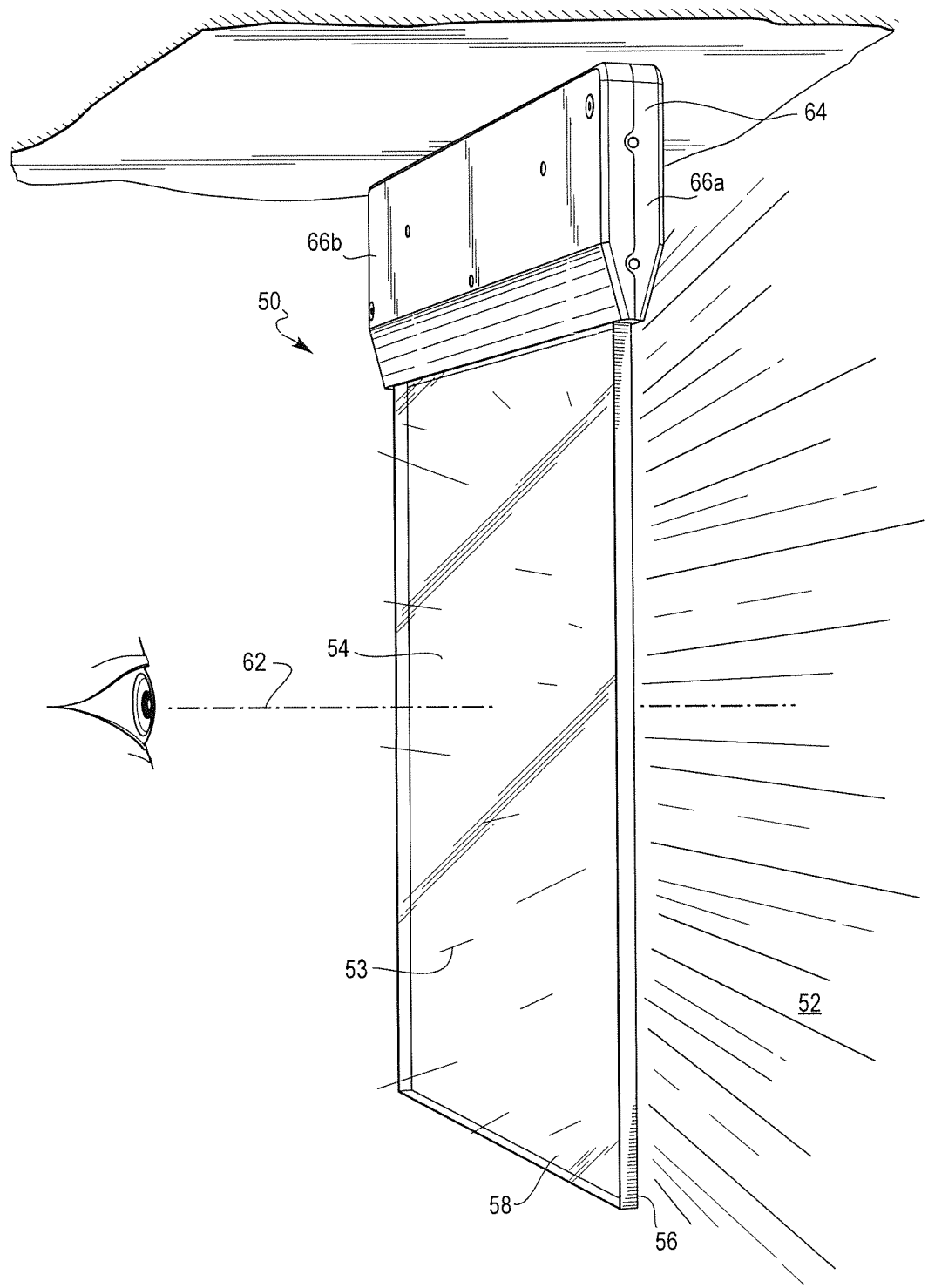
FIG. 1 is an isometric view of an embodiment of a luminaire in a room.

Referring to FIG. 1, a luminaire 50 providing an illuminance distribution 52 with hidden luminance 53 is shown. The luminaire 50 includes an optical waveguide 54 having a first surface 56 and a second surface 58 opposite the first surface 56. At least 80%, preferably at least 90%, and most preferably at least 95%, of light produced by a light source 60 (FIG. 4) is directed by the waveguide 54 into the illumination distribution 52 emitted from the first surface or light emitting surface 56 of the waveguide 54. Further, the illumination distribution 52 is visible through the waveguide 54 along a line of sight 62 extending from the second surface 58 to the first surface 56. The optical waveguide 54 exhibits a luminance 53 from the second surface 58 along the line of sight 62 that is less than about 20%, preferably less than about 10%, and most preferably less than about 5% of the total luminance of the luminaire. Generally, "hidden luminance" refers to the visibility of the illumination distribution 52 along the line of sight 62 through the waveguide 54 while the luminance 53 from the second surface 58 along the line of sight 62 is minimized, during use (i.e., when power is supplied to the light source 60 (FIG. 4)). The line of sight 62 may be perpendicular or angled relative to the first and second surfaces 56, 58 of the waveguide 54. Even further, simulations have shown that the embodiments described herein provide an optical efficiency of at least 90%, and in particular at least 95%.

Figure 2:
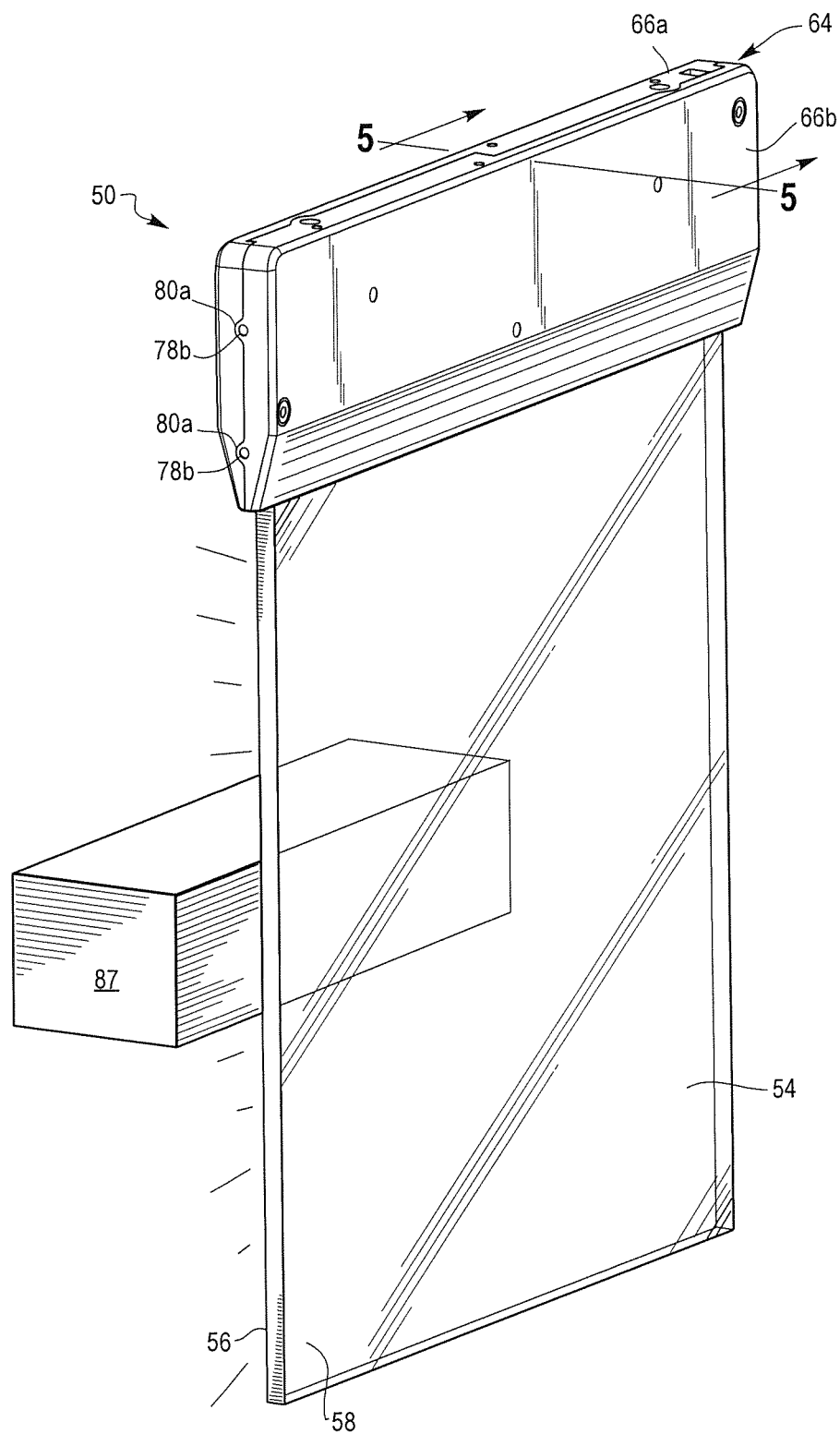
FIG. 2 is a front isometric view of the luminaire of FIG. 1.
Figure 2A:
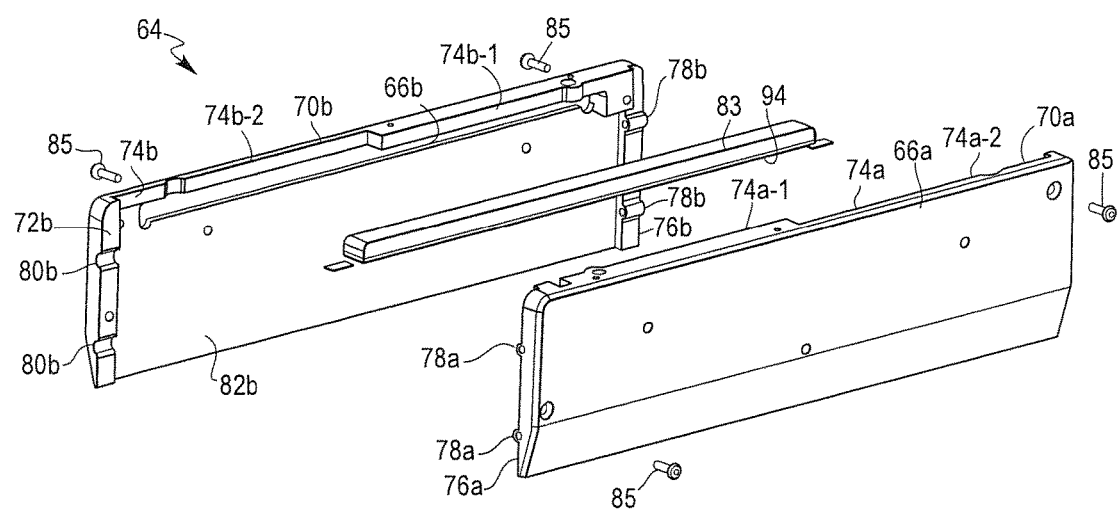
FIG. 2A is an exploded view of a housing of the luminaire of FIG. 1.

As seen in FIG. 2, the waveguide 54 of the luminaire 50 extends from a housing or enclosure 64 having a first part 66a and a second part 66b. In the illustrated embodiment, the first and second parts 66a, 66b are identical in shape and, during use, are oriented in opposite directions to interlock with one another. As seen in FIG. 2A, each part 66a, 66b includes a peripheral edge 70a, 70b that extends inward along first, second, and third surfaces 72a, 72b, 74a, 74b, and 76a, 76b, respectively. The first and second parts 66a, 66b are oriented relative to one another such that the first and third surfaces 72a, 76b and 72b, 76a mate together. Two screw holes 78 are formed along the third surfaces 76a, 76b, and two indents 80a, 80b are formed along the first surfaces 72a, 72b to mate with the two screw holes 78a, 78b of the corresponding part. Each second surface 74a, 74b includes a raised portion 74a-1, 74b-1 and a lowered portion 74a-2, 74b-2 that mate with the raised and lowered portions of the corresponding second surface 74a, 74b. The fourth surfaces 82a (FIG. 4), 82b (FIG. 2A) are spaced apart so as to allow the waveguide 54 to extend therefrom. A recess 83 is formed adjacent the second surfaces 74a, 74b of the first and second parts 66a, 66b, and a light source member 83a is disposed therein. The first and second parts 66a, 66b are held together by fasteners 85, although any suitable fastening means may be used. An illuminated surface of an object 87 is viewed through the waveguide 54 and illuminated by the luminaire 50.

Figure 3:
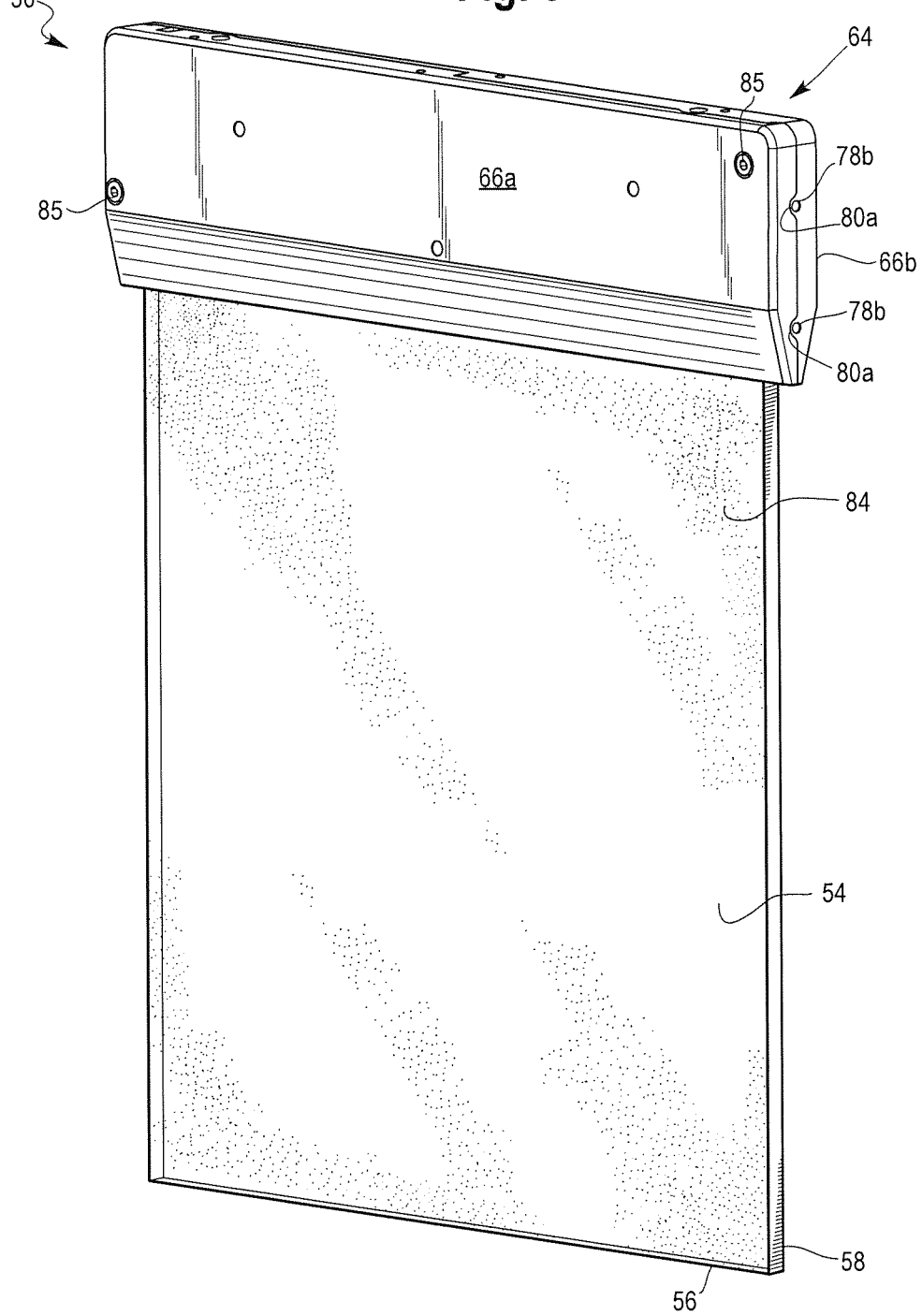
FIG. 3 is a rear isometric view of the luminaire of FIG. 1.

Referring to FIG. 3, extraction features 84 are disposed on the first side 56 of the waveguide 54. In some embodiments, the extraction features 84 are not visible to the viewers in the room. In other embodiments, the extraction features are arranged in a regular array such as a hexagonal close-packed array. In still other embodiments, the extraction features are arranged in a specific pattern (density pattern) in order to improve optical efficiency, luminance uniformity, or provide a desired visual effect, image, or luminance pattern (logo, picture, graphic etc.).

Figure 4:
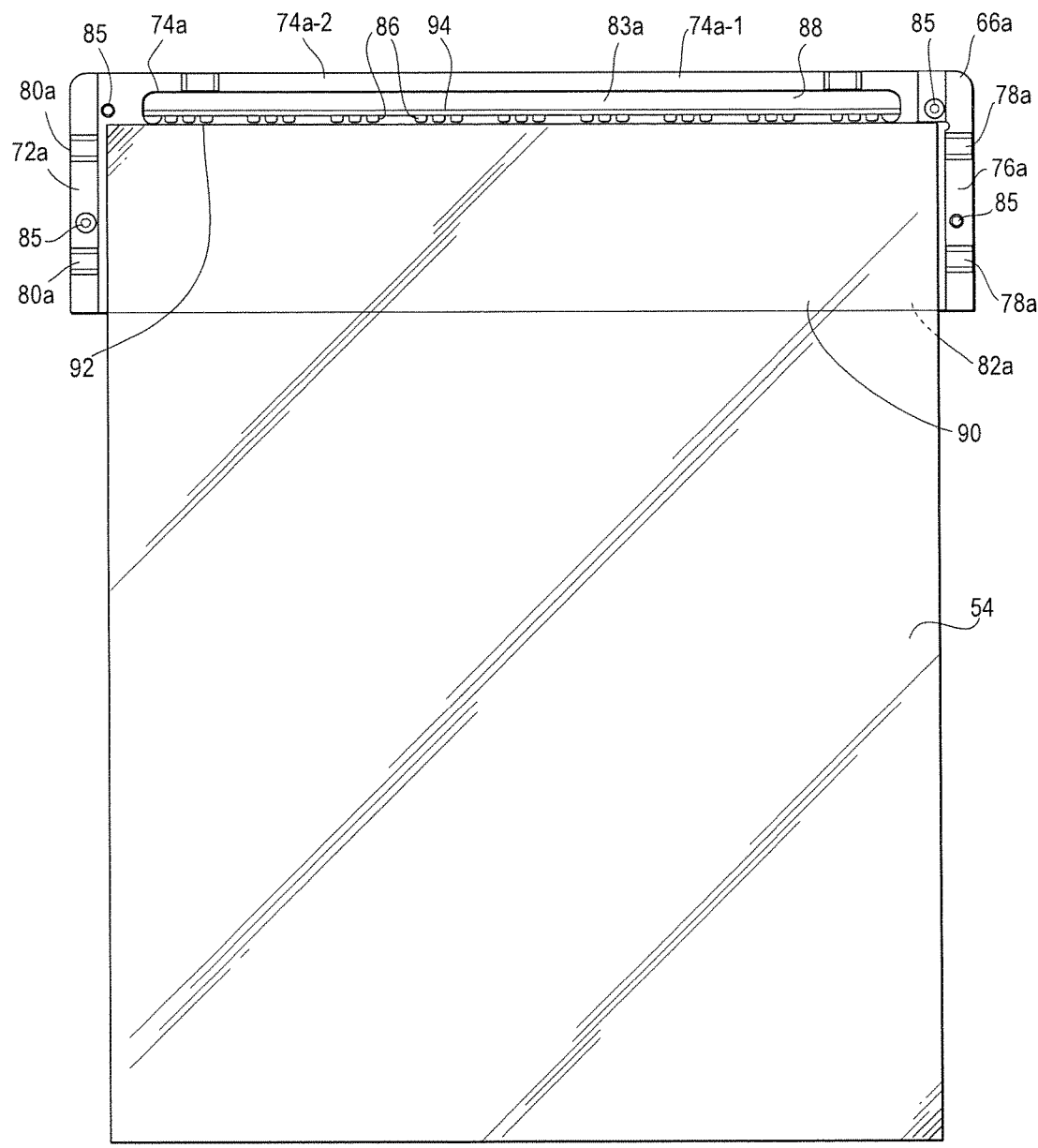
FIG. 4 is a fragmentary, front elevational view of the luminaire of FIG. 1.
Figure 5:
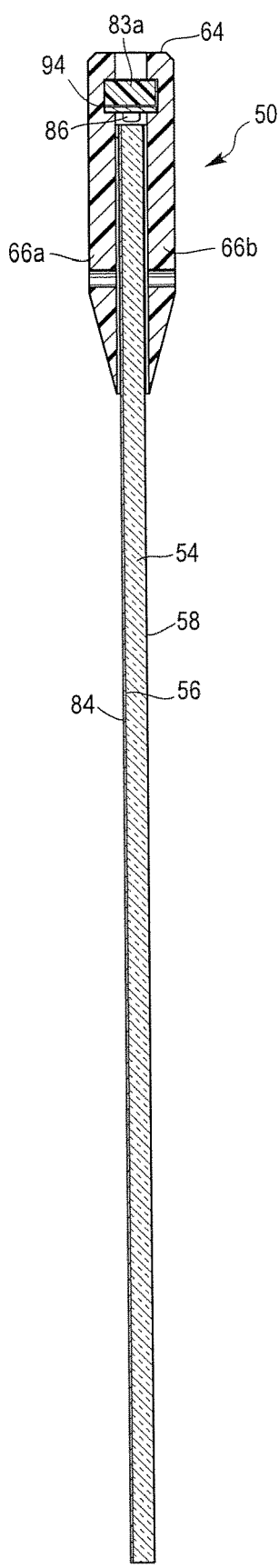
FIG. 5 is a sectional view of the luminaire of FIG. 1 taken generally along the lines 5-5 of FIG. 2.

FIG. 4 illustrates LED elements 86 disposed in a first end 88 of the housing 64 adjacent the second surface 74a of the first part 66a. The waveguide 54 extends from a second end 90 of the housing 64 opposite the first end 88 formed by the fourth surfaces 82a, 82b (FIG. 2A) of the first and second parts 66a, 66b (FIG. 2A). In the illustrated embodiment, the waveguide 54 is edge-lit along a coupling surface 92 by the plurality of LED elements 86. The LED elements 86 are disposed on a printed circuit board 94 mounted on the light source member 83a and spaced apart from the coupling surface 92 of the waveguide 54. Other types of coupling and/or orientation of the LED elements 86 relative to the waveguide 54 may be used. In alternative embodiments, the luminaire 50 may include more than one waveguide and may utilize interior-lit coupling, multiple-edge coupling, or a combination thereof. The type of coupling may influence the angular and spatial distribution of light within the waveguide, which in turn can influence the efficiency of extraction, the illuminance, and the luminance.

Various types of LED elements may be used, including LED packages having primary optics as well as bare LED chips. Each LED element or module 86 may be a single white or other color LED, or each may comprise multiple LED elements either mounted separately or together on a single substrate or package to form a module including, for example, at least one phosphor-coated LED either alone or in combination with at least one color LED, such as a green LED, a yellow LED, a red LED, etc. In those cases where a soft or warm white illumination is to be produced, each LED element or module 86 or a plurality of such elements or modules may include one or more blue shifted yellow LED elements and one or more red LED elements. The LED elements 86 may be disposed in different configurations and/or layouts as desired. Different color temperatures and appearances could be produced using other LED combinations, as is known in the art. The luminaire may include LEDs 65 of the same type of phosphor-converted white LED, or any combination of the same or different types of LEDs discussed herein. In some embodiments, a luminaire may include a plurality of groups of LEDs 65, where each group may include LEDs 65 having different colors and/or color temperatures. The groups of LEDs 65 may be separated by dividers, as described in U.S. patent application Ser. No. 14/472,035, filed Aug. 28, 2014, entitled "Luminaire Utilizing Edge Coupling", incorporated herein by reference, wherein the LEDs 65 are disposed within the coupling cavity. Such dividers facilitate the mixing of light between adjacent LEDs 65, limit the angle of incidence of light incident on the first and second coupling surfaces XX of the waveguide, and reduce interaction and light absorption between LED components 65. In embodiments having LEDs of the same or similar color, dividers may not be necessary or desired. Further, in one embodiment, the light source comprises any LED, for example, an MT-G LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is incorporated by reference herein, may be utilized. In some embodiments, each LED element or module 86 may comprise one or more LED elements disposed vertically within the coupling cavity. In any of the embodiments disclosed herein the LED element(s) or module(s) 86 may have a Lambertian or near-Lambertian light distribution, although each may have a directional emission distribution (e.g., a side emitting distribution), as necessary or desirable. More generally, any Lambertian, near-Lambertian, symmetric, wide angle, preferential-sided, or asymmetric beam pattern LED(s) may be used as the light source.

Figure 6:
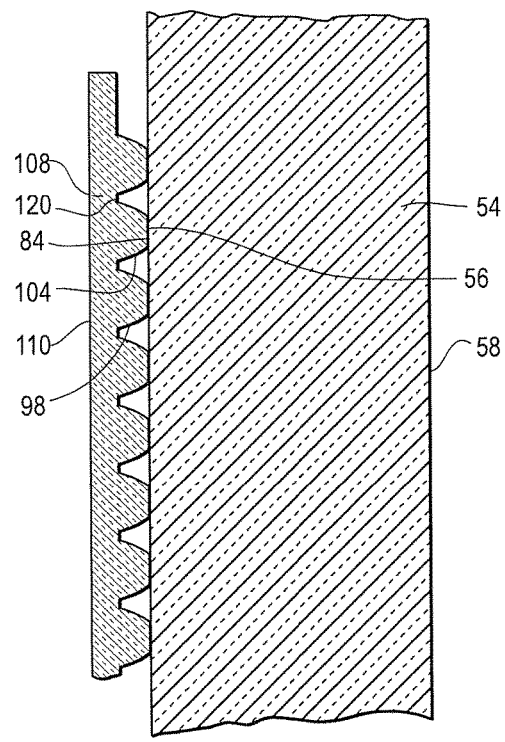
FIG. 6 is an enlarged side elevational view of a waveguide of the luminaire of FIG. 1.

Referring to FIGS. 5-8, light is extracted predominantly out of the first surface 56 of the waveguide 54 by the extraction features 84 bonded thereto. Each extraction feature 84 includes a body 96 (FIG. 7) having a curved shape 98 that extends between an aperature 100 adjacent the first surface 56 of the waveguide 54 and a base 102 opposite the aperture 100. The aperture 100 and the base 102 may be parallel or disposed at an angle relative to one another. As seen in FIG. 6, the curved shape 98 includes an outer surface 104 that is undercut relative to the first surface 56 of the waveguide 54. The outer surface 104 may include planar surfaces, curved surfaces, planar surfaces approximating a curve, or a combination thereof. The profile of the outer surface may be symmetric in nature (e.g., as in the case of a hemisphere) or asymmetric (e.g., as in the case of an ellipse or other combination of shapes). The extraction features and/or waveguide may be acrylic, including an acrylic UV-curable resin, silicone, polycarbonate, glass, or other suitable material(s) and combinations thereof, possibly in a layered arrangement, to achieve a desired effect.

In the embodiment shown in FIGS. 6-8, the extraction features 84 may be formed on a member 108 that is subsequently bonded or otherwise optically joined to the first surface 56 of the waveguide 54. The member 108 may be a film, a glass, an acrylic, or any suitable optically transmissive material. For example, the member 108 may comprise an acrylic, polyethylene terephthalate (PET)- or polyester-based film (e.g., brand name "mylar") or a film of any other suitable material upon which extraction features are formed or replicated. The extraction features 84 may comprise a suitable optical material such as acrylic, acrylic-based resins, polycarbonate, glass, or other materials having suitable optical and structural properties. The film may be fabricated using one of a variety of techniques typically applied to the formation of micro-optical films, including embossing, photolithography, gray-scale lithography, micro-replication, injection/compression molding, reactive ion etching, chemical embossing, casting, or drum roll transfer. Other methods of fabrication include dispensing an acrylic-based UV-curing resin or silicone material on a carrier film that is subsequently cured to form extraction features. The resulting extractor film or sheet may be laminated or otherwise attached to the first surface 56 of the waveguide 54 either directly or with one or more intermediate layers using a variety of bonding methods including ultrasonic bonding, laser bonding, adhesive bonding, pressure-sensitive adhesive bonding, chemical welding, thermal bonding.

In some embodiments, the extraction features 84 may be disposed on the waveguide 54 without a member 108. For example, the extraction features 84 may be fabricated directly on the first surface 56 of the waveguide 54 by means of an intermediate patterning layer as described in U.S. Pat. No. 8,564,004, issued Oct. 22, 2013, entitled "Complex Primary Optics with Intermediate Elements" by Tarsa et al., incorporated by reference herein. Using this method of manufacture, the extraction features 84 are optically joined to the waveguide 54 without the need for the substrate 108. The patterning layer may be used with any method such as molding, injection molding, compression molding, dispensing, stencil printing, three-dimensional printing, photolithography, deposition, or the like. Specifically, the patterning layer is formed on the first surface 56 of the waveguide 54 and includes holes or openings where the waveguide 54 is exposed. The openings of the patterning layer correspond to locations where the extraction features 84 are to be formed on the waveguide 54. In some embodiments, a mold is then placed over the patterning layer and first surface 56 of the waveguide 54. The mold includes voids that are aligned with the openings of the patterning layer to define cavities. The cavities are filled with the material of the extraction features 84. In other embodiments, the material of the extraction features 84 is applied to the openings of the patterning layer prior to placement of the mold on the patterning layer. In either case, the material of the extraction feature 84 is then at least partially cured and the mold is removed. The material of the patterning layer may comprise polyvinyl alcohol, a poly(methyl methacrylate) (PMMA) one or more photoresist materials, or other suitable materials. The patterning layer may be removed by a water rinse, heat, vaporization, machining, developers and solvents, chemical etching/solvent, plasma etching, or any method that does not interfere with the material of the waveguide 54 and/or extraction features 84. Alternatively, the waveguide 54, the extraction features 84, and/or the member 108 may be bonded to one another through one or more supplemental layers such as an adhesive layer or pressure-sensitive adhesive film.

Figure 11A:
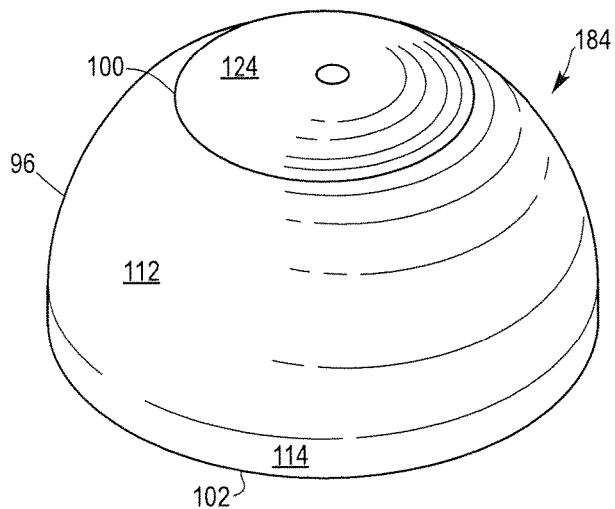
FIGS. 11A-11C are isometric, side elevational, and plan views, respectively, of a further embodiment of an extraction feature before application to a waveguide.
Figure 11B:
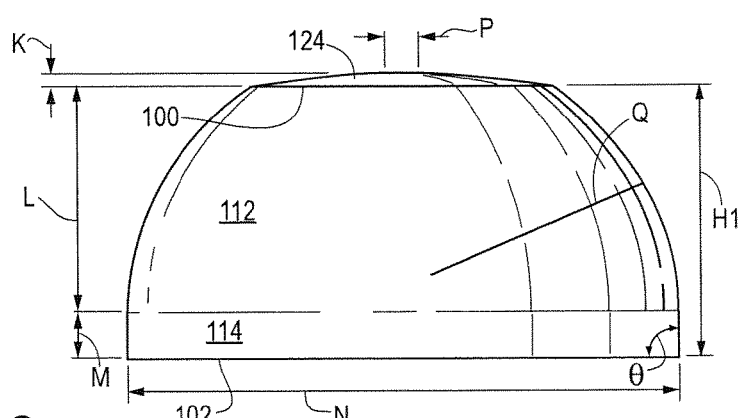
Figure 11C:
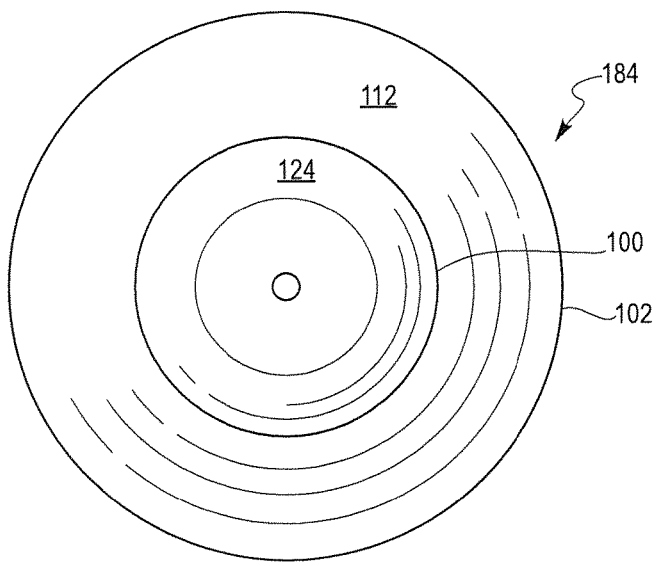
Figure 14:
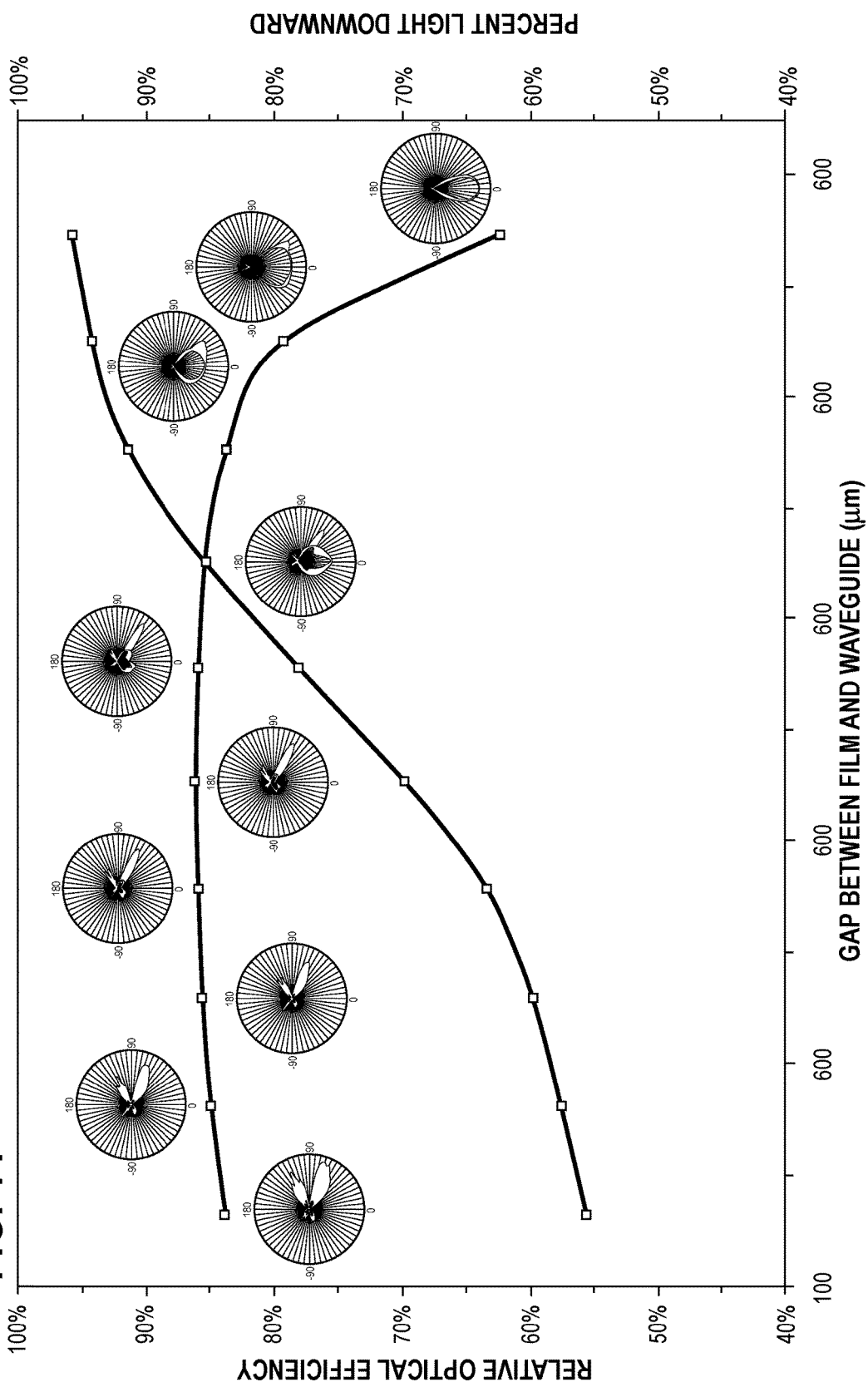
FIG. 14 is a graph illustrating light illumination distribution as a function of extraction feature height of the luminaire of FIG. 1.

The optical efficiency, directionality, luminance, and illuminance of the waveguide-based luminaire depend sensitively on the particular geometry and arrangement of extraction features 84. One class of extraction feature geometries which is particularly useful for a range of lighting applications comprises a roughly "bullet shaped" profile as illustrated in FIGS. 11A-11C consisting of a truncated curved surface such as a truncated hemisphere with an adjacent cylindrical or conical base. This particular geometry provides a high degree of directionality as well as a range of possible illuminance distributions which may be realized by changing the height at which the curved surface is truncated. Referring to FIG. 8, the truncation height H1 of the extraction feature 84 corresponds to a gap 106 between the first surface 56 of the waveguide 54 and the base 102 of the extraction feature 84. In some embodiments, the truncation height H1 is large (resulting in a nearly hemispherical top extractor portion with a small flat surface at the tip) and light is extracted predominantly perpendicular from the first surface 56 of the waveguide 54 to form a "spot light" distribution. In other embodiments, by varying the height H1, light may be extracted to form a "lambertian" distribution, or into a "split" distribution in which light is emitted predominantly in a direction more parallel to the waveguide 54. Variation in the dimension of the gap 106 results in variation of the illumination distribution 52 as described in U.S. patent application Ser. No. 14/472,064, filed Aug. 28, 2014, entitled "Luminaire with Selectable Luminous Intensity Pattern" by Tarsa et al. In some embodiments, the gap may range from about 10 µm to about 590 µm, preferably about 100 µm to about 550 µm. In the case of a purely hemispherical extraction feature 84 with no cylindrical or conical base, the gap 106 may range from 95% of the radius of the hemisphere to 5% of the radius of the hemisphere, preferably from 80% of the radius of the hemisphere to 20% of the radius of the hemisphere. By adding a conical base to the hemisphere as shown in FIG. 11, the directionality of the emitted light may be further increased. As illustrated in FIG. 14, the luminaire 50 having extraction features 84 as shown in FIGS. 11A, 11B and 11C described below thereon produces a luminous intensity pattern or distribution that varies with feature height H1, or gap 106. The luminous flux distributions shown in FIG. 14 assume that the extraction features 84 are all of substantially the same shape. As seen in the FIG. 14, the luminous intensity pattern varies from an asymmetric distribution at feature heights H1 of about 170 µm, to a task lighting or "spotlight" distribution at a feature height of about 560 µm. In this case, the asymmetry with respect to the vertical axis in the illuminance distribution plot is related to the positioning of source along one edge of the waveguide. A more symmetric pattern (e.g., mirrored about the vertical axis in the plot) would result from illuminating the waveguide from two opposing edges. Generally, the variances in illuminance result from variations in optical coupling surface area and extractor aperture area between the extraction features 84 and the waveguide 54 as the cross-sectional dimensions of the interface between features 84 and the waveguide vary with extraction feature (truncation) height H1.

Referring to FIGS. 8, 9A, 9B 10A, 10B, and 11A-11C, while a simple truncated hemispherical extractor shape can provide a range of desirable illuminance distributions, the addition of a cylindrical or conical extension to the base of the hemisphere can increase the directionality of the emitted light. This directionality (i.e., the portion of light emitted from the first side 56 of the waveguide relative to the portion of light emitted from the second side 58) is essential for realizing luminaires with hidden luminance. In the example illustrated in FIGS. 9A and 9B, the extraction feature 84 includes a first portion 112 adjacent the aperture 100 and a second portion 114 adjacent the base 102. In a more general case, the first portion 112 need not be hemispherical, and the second portion 114 may be cylindrical, conical, or curved, as desired. The first portion 112 may have a height that ranges from about 5 µm and about 2 mm. The second portion 114 may have a height that ranges from about 5 µm and about 2 mm, although some embodiments may not include a second portion 114. The shapes 112 and 114 may be circumferential such that the cross section transverse to a central axis 118 (FIG. 9A) is circular throughout the height H1 (FIG. 8) of the extraction feature 84. Alternatively, the shapes 112 and 114 may have non-circular cross-sections (e.g., elliptical or faceted). In some embodiments, the base diameter $d_b$ of the extraction feature 84 may be approximately two times a height H1.

In other embodiments, the first portion 112 may be designed to redirect incident light downward through total internal reflection (TIR). A shape of the extraction feature 84 may be determined by iteratively plotting the points using a differential or quasi-differential equation. One iterative process includes the steps of defining a start point at coordinates r, h, calculating a slope necessary to achieve total internal reflection, and, based on the calculated slope, further calculating the necessary incremental radial step Δr that corresponds to a predetermined incremental height change Δh, moving to a new point r+Δr and h+Δh, and repeating the calculation and moving steps until the desired total height is reached. In other embodiments, the shape of the extraction feature 84 may be designed using geometric and/or differential equations possibly in combination with other curved, planar, or piecewise linear surfaces.

An example of the foregoing iterative process includes the use of Equations 1 and 2 below that are entered into an optimization routine such as Solver by Microsoft Excel®. Generally, a profile of the extraction feature 84 is defined by calculating a series of slopes dh/dR at incremental points 202a, 202b, . . . , 202N along an outer surface 116 of the first portion 112 of the extraction feature 84. The outer surface 116 is then rotated about the central axis 118 to define the extraction feature 84.

$$\varphi = \text{ArcTan}\left(\frac{h}{R + Ro}\right) \qquad \text{Equation 1}$$

$$\text{Slope} = \frac{dh}{dR} = \tan(\varphi + \alpha) \qquad \text{Equation 2}$$

In Equation 1, the sharpest angle φ of a ray of light striking a given point, for example, 202d on the outer surface 116 is determined. As seen in FIG. 10C, the sharpest angle φ is defined by a light ray 204 entering the aperture 100 at an edge 206 thereof opposite to the point 202d, and is measured relative to a surface normal 208 of the aperture 100. The angle φ is calculated based on the coordinates of the point 202d relative to the entry of the light ray 204 into the extraction feature 84 at the edge 206 of the aperture 100. Specifically, the point 202d has a y-coordinate value h relative to the respective waveguide surface 56 and an x-coordinate value $R_o$+R, where $R_o$ is a distance from the edge 206 to the central axis 118 (i.e., an aperture radius) and R is a distance from the central axis 118 to the point 202d.

Using Equation 2, the slope dh/dR at the point 202d along the outer surface 116 is then calculated. Equation 2 ensures that the resultant incident angle δ relative to a surface normal 210 at point 202d exceeds the critical angle θ relative to the surface normal 210. As shown in FIG. 10C, the angle α is the angle complementary to the critical angle θ. In the illustrated example, the resultant incident angle δ of the light ray 204 is approximately the same as or greater than the critical angle θ such that the light ray 204 is totally internally reflected by the outer surface 116 of the extraction feature 84 and emitted through the base 102 thereof.

Once the slope dh/dR for the point 202d is calculated, the angle φ is calculated using Equation 1 for the next point 202e having incremental changes Δh, ΔR along the x- and y-coordinates h, R. The slope dh/dR for the point 202e is then determined using Equation 2, and the process is repeated until a known parameter is satisfied, for example, once the height distance h reaches the height F (FIG. 10A) of the first portion 112, or in some cases the total height F+G (FIG. 10A), of the extraction feature 84. The incremental change Δh may range from about 1 nm to about 1 μm, or may be a fraction, such as $\frac{1}{50}^{th}$, of the total height F+G (FIG. 10A) of the extraction feature 84.

In some embodiments, Equation 2 may be implemented with a conditional check to specify an upper limit for the slope dh/dR. The upper limit may be used in lieu of the calculated slope as desired. For example, referring to FIG. 10C, the upper limit may be specified as angle β, defined by an outer surface 122 of the second portion 114 relative to the base 102. Once the calculated slope dh/dR of points 202 along the outer surface 116 of the first portion 112 reaches the upper limit of angle β, each slope dh/dR for the subsequent points 202 along the outer surface 122 of the second portion 114 are constant and equal to β so as to form the conical shape.

In some embodiments, the optimization routine may determine the aperture radius $R_o$ for a preferred area ratio (i.e., ratio of aperture area to base area) subject to user defined conditions, such as the total height F+G (FIG. 10A), the critical angle θ (based on the relative indices of refraction), and the desired smallest angle $\varphi_{min}$ defined by the sharpest angle φ of a light ray 212 that strikes the point 204N on the outer surface 132 at the base 122 of the extraction feature 116. Other user defined conditions may be specified as desired. In one embodiment, the outer surfaces 124, 132 designed in accordance with the description above results in extraction of over 95% of light out of the first surfaces 62a, 64a of the waveguide 42.

Figure 7:
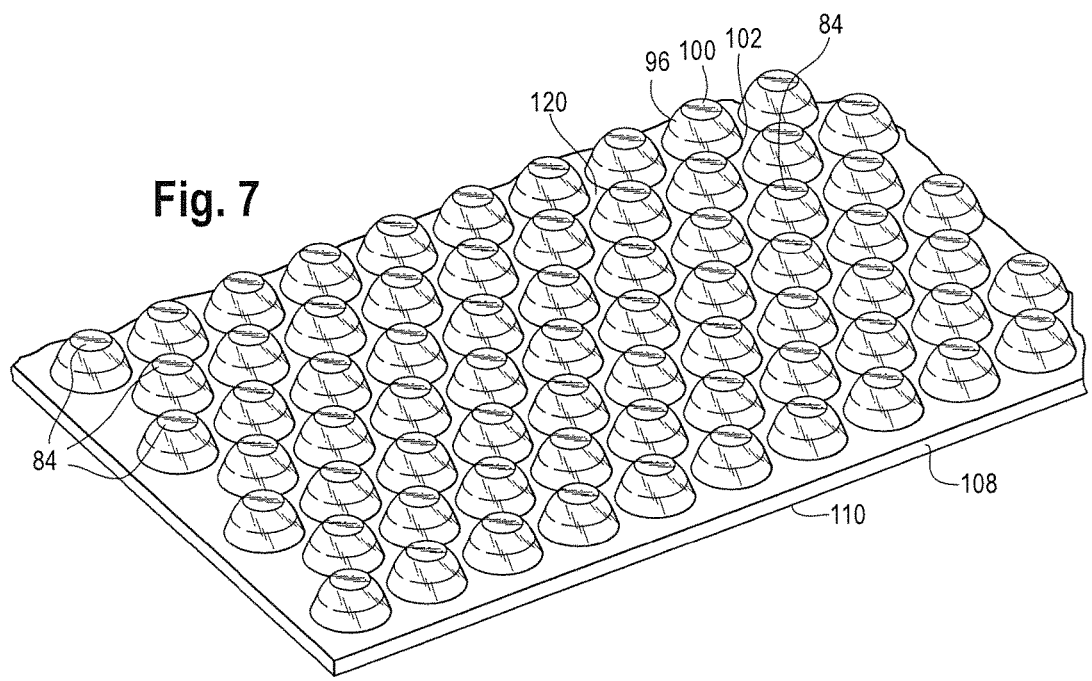
FIG. 7 is a fragmentary isometric view of an embodiment of extraction features utilized in the luminaire of FIG. 1.
Figure 8:
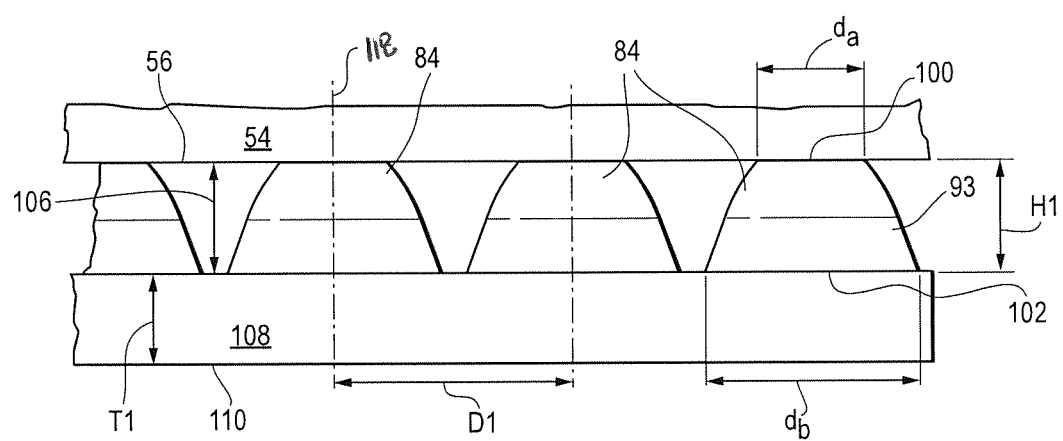
FIG. 8 is a side elevational view of the extraction features of FIG. 7.

In the example embodiment shown in FIGS. 7 and 8, the plurality of extraction features 84 may be formed in a hexagonal array pattern atop the member 108. Other patterns may be used to produce a desired illuminance distribution. The extraction features 84 may be irregularly spaced, or some may be regularly spaced and others irregularly spaced, etc. The thickness T1 of the member 108 may range from 10 μm to 5 mm, preferably from 250 μm to 2 mm. The center-to-center distance D1 between adjacent extraction features 84 may range from less than twice the feature radius (e.g., overlapping features) to 10 mm, preferably from twice the feature radius to 5 mm. The thickness T1 and distance D1 may be constant or may vary throughout the first surface 56 of the waveguide 54. The shape, size, or density of extraction features 84 may be varied across the surface 56 of the waveguide 54 in either a regular or irregular fashion to produce a desired illuminance distribution. For example, a plurality of members 108 or films having differently shaped extraction features 84 may be bonded to the waveguide 54 to produce an asymmetric illumination distribution. The aperture diameters $d_a$, the base diameters $d_b$, and the heights H of the extraction features 84 may all be the same or different, and may be varied over the surface 56 of the waveguide 54 to provide varying illumination patterns, as desired. Further, it may be desirable to fabricate varying degrees of roughness, or specific optical features, such as a second set or array of geometrical features, on an outer surface 110 of the member 108 in order to further provide control over the luminance and illuminance distributions. In other embodiments, the extraction features 84 may be positioned to extract the luminance from both of the first and second surfaces 56, 58.

Figure 9A:
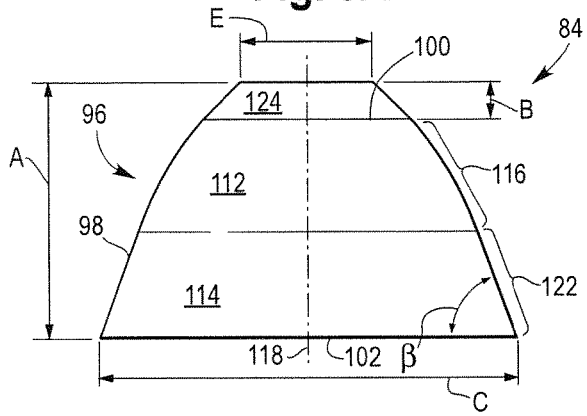
FIGS. 9A and 9B are side elevational and plan views, respectively, of the extraction features of FIG. 7 before application to a waveguide.
Figure 9B:
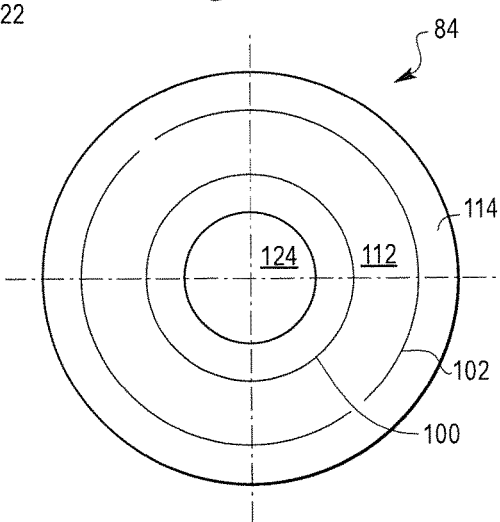

FIGS. 9A and 9B illustrate the body 96 of the extraction features 84 prior to bonding on the first surface 56 of the waveguide 54. The first outer surface 116 of the first portion 112 is rotated about a central axis 118. The curvature of the first portion 112 of the extraction feature 84 is designed to minimize the amount of light that is redirected back into the waveguide 54 either directly from the extraction feature 84 or indirectly from an adjacent portion 120 (FIG. 7) of the member 108 between extraction features 84. Such minimization results in a high extraction efficiency out of the first surface 56 of the waveguide 54 (high directionality). In the illustrated embodiment, the curved shape is defined by the Equations 1 and 2.

A second outer surface 122 of the second portion 114 has a conical shape that forms an angle β with the base 102. The angle β may range from 1 degree to 90 degrees, preferably from 60 degrees to 90 degrees. Further, the body 96 may include a bonding feature 124 formed atop the aperture 100 to facilitate bonding of the extraction feature to the waveguide surface 56. The actual geometry of the bonding feature 124 may vary depending on the particular bonding approach used. For example, the bonding feature 124 may be convex in nature (as illustrated in FIG. 9A) so as to limit the formation of trapped air bubbles at the interface when a liquid or gel-like adhesive layer is used to bond the film to the waveguide. The design of bonding feature 124 may also be such that the displacement of adhesive is minimized during bonding, thereby minimizing 'wicking' of the displaced adhesive along the first and second portions 112, 114 where it might interfere with the optical function of these surfaces. In general, it is intended that part or all of the bonding feature 124 becomes optically inactive following the bonding process, thus having minimal impact on the resulting light distributions and efficiencies. A similar bonding feature 124 is shown with the extractor geometry of FIG. 11. In an alternate embodiment, the bonding feature 124 may comprise an adhesive material which serves to bond the extraction feature to the first surface 56 of the waveguide 54.

Figure 10A:
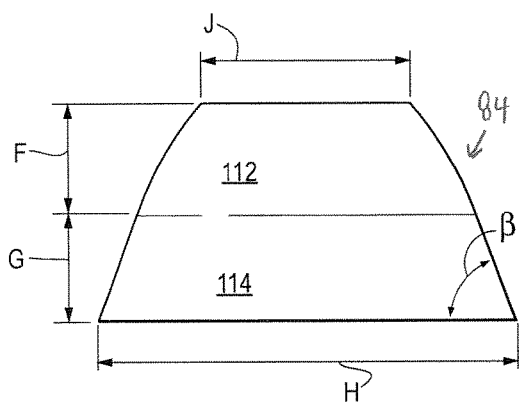
FIGS. 10A-10C are side elevational, plan, and side elevational views, respectively, of the extraction features of FIG. 7 after application to a waveguide.
Figure 10B:
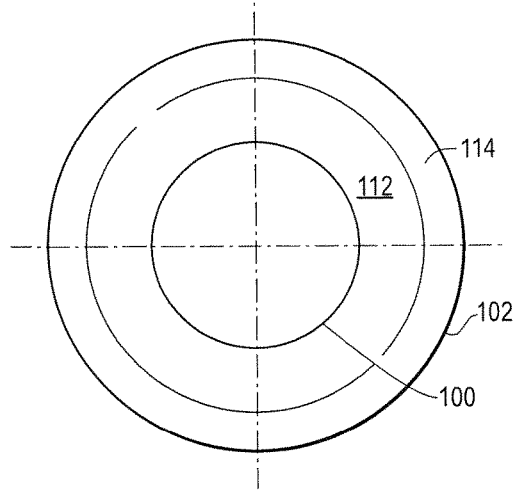
Figure 10C:
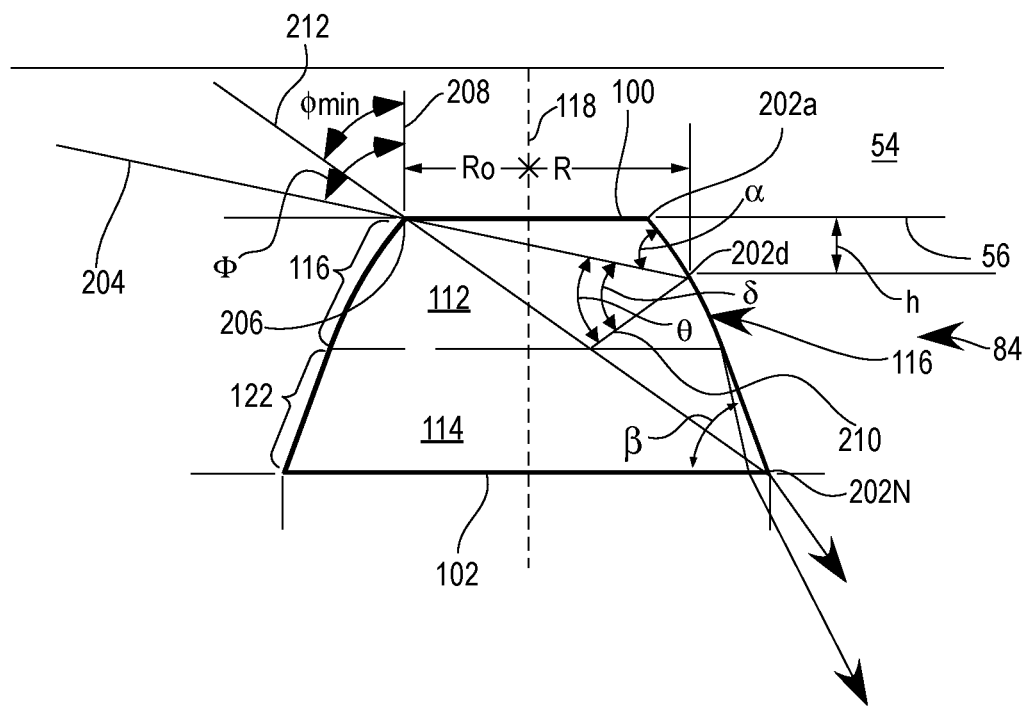

FIGS. 10A and 10B illustrate the extraction feature 84 of FIGS. 9A and 9B as adhered to the first surface of the waveguide. Example dimensions of the extraction feature of FIGS. 9A, 9B, 10A, and 10B are provided below. In one embodiment, a luminaire having a plurality of extraction features of FIGS. 10A and 10B extracts approximately 97% of the illuminance 52 from the first surface and approximately 3% of the luminance 53 from the second surface.

TABLE 1

| FIG. 9A | |
|---|---|
| A | 33 μm |
| B | 5 μm |
| C | 53.26 μm |
| E | 16.716 μm |
| β | 70 degrees |
| FIG. 10A | |
| F | 13.95 μm |
| G | 14.050 μm |
| H | 53.26 μm |
| J | 26.716 μm |
| β | 70 degrees |

FIGS. 11A-11C illustrate a further embodiment of an extraction feature 184. The first portion 112 of the body 96 has a hemispherical shape, although other geometries such as a parabolic shape, "free form" curves, planar, and/or piecewise linear shapes may be used to produce an illumination pattern as desired. The second portion 114 has a nearly-cylindrical conical shape, although other shapes may used as desired. Similar to the feature of FIGS. 9A and 9B, bonding feature 124 is formed on the aperture 100 to facilitate bonding to the first surface 56 of the waveguide 54. Sample dimensions of the extraction feature of FIGS. 11A-11C are provided in Table 3. In another embodiment, a luminaire having a plurality of extraction features of FIGS. 11A-11C extracts approximately 94% of the illuminance 52 from the first surface and approximately 6% of the luminance 53 from the second surface.

TABLE 2

| | |
|---|---|
| K | 0.05 mm |
| L | 0.415 mm |
| M | 0.085 mm |
| N | 1 mm |
| P | 0.05 mm |
| Q | 0.510 mm radius of curvature |
| θ | 89 degrees |

In still further embodiments, the extraction features 84 may have an asymmetric shape. For example, the first portion 112 of the extraction feature 84 may be hemispherical and the base 102 may be elliptical such that the feature 84 appears as a truncated hemisphere when viewed from any cross-section, but appears as an ellipse or elongated circle when viewed from the top. Such asymmetric geometry would result in an asymmetric illuminance pattern such that may be desired for certain applications, such as roadway lighting. Further, the extraction features 84 having an asymmetric cross-section along the height H1 (i.e., coplanar with the central axis 118) may direct light into particular directions or quadrants below the luminaire. Extraction features 84 with segmented cross-sections and top profiles consisting of a combination of curved surfaces and linear surfaces (such as an extractor that appears as a truncated hemisphere from the side, but appears as a star-shape or faceted shape from above) may be used for specific lighting applications requiring a very unique and defined illuminance distribution (e.g., stage lighting, architectural or cove lighting). Finally, extraction features having a generally conic or parabolic shape (symmetric or asymmetric, truncated or not) may produce more collimated light beams in specific directions (e.g., for direct/indirect pendant lighting, downlighting, etc.).

Figure 12:
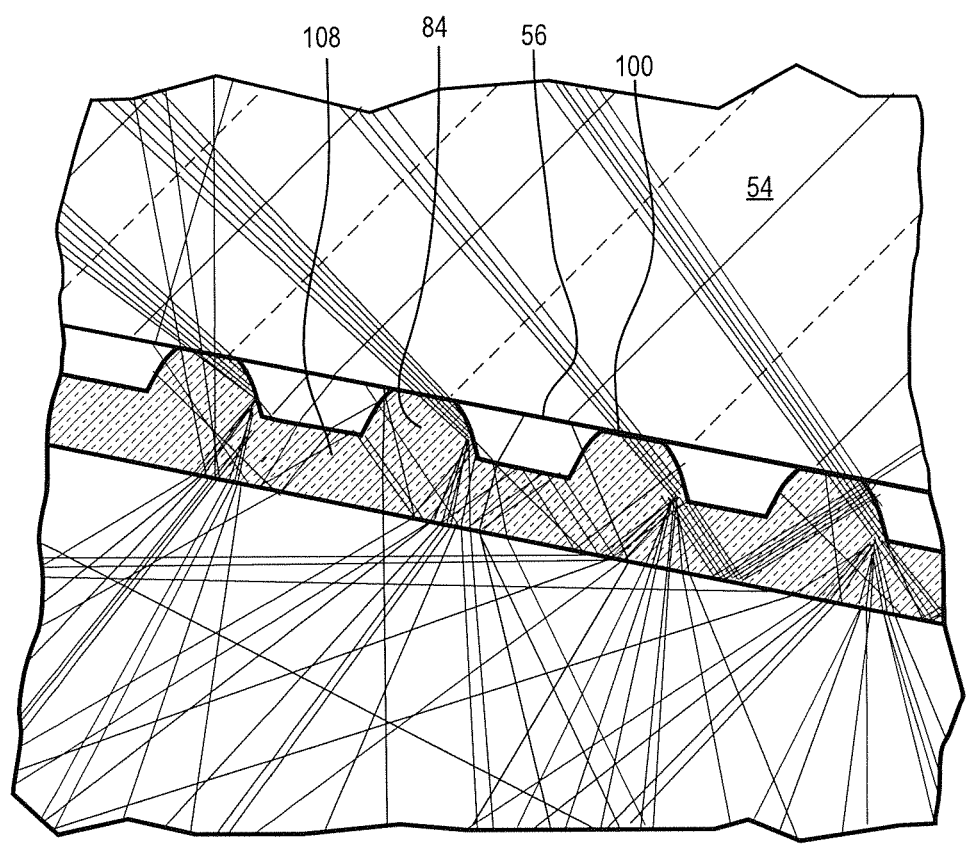
FIG. 12 is an enlarged side elevational view of a waveguide of the luminaire of FIG. 1.

The extraction features 84 illustrated in FIGS. 6-11C, referred to herein as "apertured extraction features" provide substantial benefits in terms of illuminance distribution control, efficiency, and directionality. As illustrated in FIG. 12, light extracted out of the waveguide first enters the extraction features 84 through the apertures 100 thereof on the light emitting surface 56 of the waveguide 54. Light rays strike the aperture 100 only after totally internally reflecting off of a further surface 58 of the waveguide 54 opposite the light emitting surface 56. In contrast, conventional (non-scattering) extraction features such as steps, hemispherical bumps, or indents formed directly on the waveguide surface generally result in optical surfaces which must interact and control light incident from both surfaces 56 and 58 of the waveguide 54. Stated differently, light generally strikes the surfaces of such conventional extraction features after totally internally reflecting off of the further surface as well as totally internally reflecting off of the area immediately surrounding the indentation. Since the optical surfaces of the extractor must handle light incident from essentially opposite directions, it is difficult to control illuminance distributions over a range of illuminance patterns with high extraction efficiency and high directionality (e.g., out of a single surface).

While use of the apertured extraction feature 84 of the present application provides control over the primary direction of the light rays hitting the extraction features 84, it may also be desirable in some applications to further control the distribution of angles about the primary directions within the waveguide. Such control may generally be achieved via a number of optical surfaces such as the primary optic or lens of the LED element, the coupling surfaces of the waveguide, etc. Controlling the angular distribution of light within the waveguide and careful design of the extraction features together with the waveguide coupling surfaces and primary component optic can provide even further control over the emitted illuminance distribution, luminance distribution, optical efficiency, and directionality of the luminaire. Even in cases where the light within the waveguide is not well controlled, the apertured extraction features can provide increased control over the distribution and efficiency of the extracted light. In both cases, highly controlled beams can be either extracted in a collimated fashion or spread into wide distribution for various selectable illumination patterns depending on the gap.

In summary, a number of factors may influence the illumination distribution emitted from the waveguide. The shape of the extraction feature, together with the spacing and pattern of the plurality of the extraction features, affect the extraction efficiency, the amount of light that is emitted from the first surface of the waveguide (directionality), the luminance and the illuminance of the luminaire. For example, an asymmetrically-shaped extraction feature may produce an asymmetric illumination distribution. In cases where the geometry of the extractor is representative of a truncated feature such as a truncated hemisphere, the truncation height—which corresponds to the distance(s) between the first surface of the waveguide and the base(s) of the extraction feature(s), significantly affects the illuminance distribution pattern. For example, the luminaire of FIG. 2 produces an asymmetric distribution when the distance is about 125 μm, while the luminaire produces a more symmetric distribution when the distance is about 600 μm. In other embodiments, variation of the distance may result in a "spot light," a "lambertian," or a "wall wash" illumination distribution. Another consideration in the design of such extractors is the primary direction that light travels through the waveguide. In an extreme comparison, a square waveguide that is illuminated from a single edge may produce an asymmetric illuminance pattern, whereas a circular waveguide illuminated around its circumference will produce a highly symmetric illuminance pattern. Various types of lamps or luminaires, including those requiring disperse or Lambertian illuminance distributions (e.g., typical troffers for general lighting), collimating distributions (e.g., downlights or spotlights), and specific illuminance patterns (e.g., streetlights, architectural lighting) can be realized using the optical waveguide and extraction features provided herein.

Figure 13:
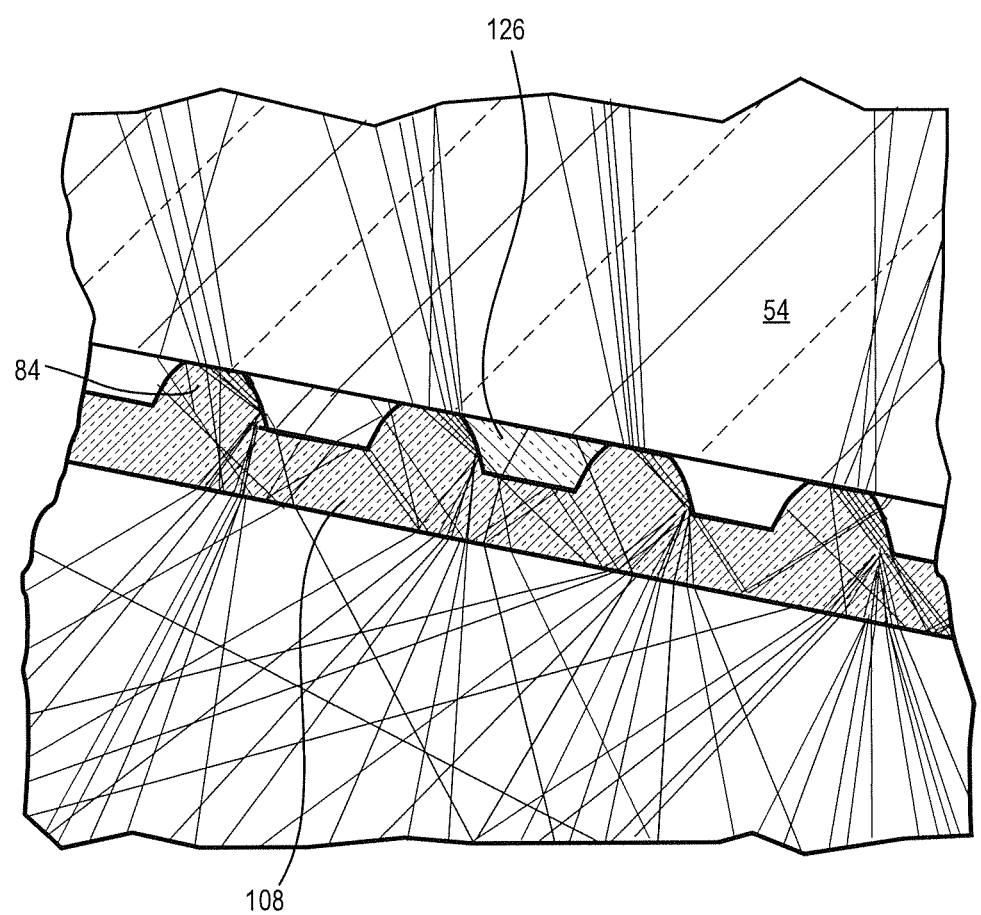
FIG. 13 is an enlarged side elevational view of a waveguide of a further embodiment of a luminaire.

Referring again to FIG. 12, the illustrated luminaire 50 includes the waveguide 54, the extraction features 84, and the member 108 comprising the same material such that the index of refraction is consistent. In this case, light is not refracted as it travels through the aperture 100. In contrast, FIG. 13 illustrates a plurality of extraction features 84 and member 108 on a waveguide 54 wherein the material of the waveguide 54 is different from the material of the extraction features 84 and member 108. In this case, light is refracted as it travels from the waveguide 54 into the extraction features 84. In still further embodiments, a region 126 (FIG. 13) between extraction features 84 after attachment to the waveguide 54 may partially or wholly comprise a material other than air. For example, the material may have an index of refraction that differs significantly from that of the waveguide 54 and the member 108. Still further, the index of refraction of the member 108 may be different from that of the waveguide 54 and/or extraction features 84 in order to achieve refraction at such interfaces. In some embodiments, it may be desired to utilize refraction to control the extraction and resulting illumination distribution.

Other parameters such as the shape, density, and material of the extraction features may also be varied to produce varied illumination patterns. Other methods for achieving directional light extraction, such as combinations of index of refraction differences in the waveguide or in elements attached to the waveguide and modifications of the shape of the waveguide itself, could also be employed to vary the illumination pattern. Further, a multi-layer protective material may optionally be attached to the first and/or second surfaces. This protective material could be removed one layer at a time during use of the luminaire to quickly provide a clear (i.e., transparent) viewing/emission surface in dirty work environments.

The high degree of light directionality enabled by the proper design of the apertured extraction features opens up a wide range of potential lighting applications. For example, highly directional emission can allow a viewer to look at a reflecting surface through the waveguide without having his or her vision significantly obscured by the luminance, or the emitted light, of the luminaire. More specifically, a viewer may look through the luminaire to the illuminated area as shown in FIG. 1. Additionally, the viewer can see the illuminance resulting from the luminaire without seeing significant luminance, even while the second surface from which light is emitted is visible to the viewer. The luminaire can also provide high levels of light from an area source (rather than a point source), concealing the light source and/or reducing or eliminating the direct glare from the source as well as the reflected glare off of surfaces.

The concept of hidden luminance with visible illuminance enabled by light directionality could find many applications in the area of architectural and display lighting. For example, in one embodiment, an enclosure for artwork may include a glass or acrylic waveguide having a micro array lenticular film bonded thereto mounted within a frame, with the light sources for the waveguide located within the frame. The waveguide serves as both protection of the art as well as a luminaire to illuminate the art in a manner in which the source of the light is not evident. Light extracted through the film toward the art provides a uniform illumination of the art without the use of external light sources, while allowing an observer to look through the glass or acrylic waveguide. Similarly, such approaches could be used in a variety of display cases, aquariums, etc.

In a still further embodiment, a luminaire enabling hidden luminance can illuminate a room. The luminaire may include a waveguide of clear material, such as glass or acrylic, having extraction features such as the micro array lenticular film bonded thereto. An array of LED elements may be arranged on one or more edges of the waveguide. The waveguide may have a thickness of about ⅛ inch and be about 6 inches by about 24 inches, about 2 feet by about 2 feet, or about 2 feet by about 4 feet, although other dimensions may be used as desired. The luminaire may be positioned to provide luminance to preferred surfaces in the room, such as a wall, floor, or ceiling, and arranged such that the luminance is directed away from room occupants. In one embodiment, a luminaire may be mounted to a ceiling with the light emitting surface of the waveguide facing the wall. The luminaire may be approximately 12 inches from the wall such that the wall is illuminated. The reflection of light off of the wall illuminates a portion or entirety of the room, giving the appearance that the surfaces are illuminated without any obvious or visible source of illumination. In other embodiments, the luminaire may also be designed to provide custom and/or adjustable illuminance patterns. In general, such light sources would be "indirect" in the sense that a surface is illuminated while the luminance is hidden from view. Example applications would include pendant lighting, cove lighting, sconce lighting, desk lighting, task lighting, track lighting, floor lamps, etc.

The luminaire could be used in a variety of other applications. For example, a work light utilizing the luminaire allows a viewer to align the viewer's line of sight with the light distribution produced by the luminaire. The work light illuminates an area while allowing the viewer to look directly through, rather than around, the waveguide to the illuminated area. The viewer could see into features such as drilled holes or other deep openings. Such a luminaire is contrasted with a conventional work light, which would necessarily be positioned out of the viewer's direct line of sight such that the work light would not fully illuminate the interior of the hole or other deep openings. A further example is a pair of glasses or goggles that emit light away from the viewer without light being projected back into the viewer's eyes.

In still another example, a luminaire could appear to be a clear plate when viewed from practical positions within a room, while providing illuminance toward a wall, ceiling, desk, task area or other surface or object. To a casual observer, the luminaire would give the impression that the light is produced with no visible source, providing architectural design flexibility, aesthetic improvement, and glare reduction. Additional applications include a face shield, a sneeze guard at a salad bar, a window that illuminates an outside area without the need for an external lighting system and external wiring, or a security window that appears to be a luminaire to the occupants of a room yet allows viewers outside of the room to see inside. Still further, the luminaire could be mounted in a ceiling panel or suspended from a ceiling using a pendant mounting apparatus. Any embodiment may incorporate piezoelectric materials or suspended particle devices that either comprise adjustable extraction features and/or allow the extraction features to be adjustable. Such adjustability would enable a variable luminance and/or illuminance pattern.

Any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al., or U.S. patent application Ser. No. 14/292,001, filed May 30, 2014, entitled "SEPIC Driver Circuit with Low Input Current Ripple" by Hu et al., incorporated by reference herein. The circuit may further be used with light control circuitry that controls color temperature of any of the embodiments disclosed herein in accordance with viewer input such as disclosed in U.S. patent application Ser. No. 14/292,286, filed May 30, 2014, entitled "Lighting Fixture Providing Variable CCT" by Pope et al. incorporated by reference herein.

Further, any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such sensor may be integrated into the light control circuitry.

INDUSTRIAL APPLICABILITY

The extraction features disclosed herein efficiently extract light out of the waveguide. At least some of the luminaires disclosed herein are particularly adapted for use in installations, such as, outdoor products (e.g., streetlights, high-bay lights, canopy lights), and indoor products (e.g., downlights, troffers, a lay-in or drop-in application, a surface mount application onto a wall or ceiling, etc.) preferably requiring a total luminaire output of at least about 100 lumens or greater, and, in some embodiments, a total luminaire output of at least about 3,000 lumens, and in other embodiments, a total lumen output of about 10,000 lumens to about 20,000 lumens. For example, a total lumen output of up to 10,000 lumens may be desired in some industrial and business lighting applications such as warehouse lighting. Further, the luminaires disclosed herein preferably have a color temperature of between about 2500 degrees Kelvin and about 6200 degrees Kelvin, and, in some embodiments, between about 2500 degrees Kelvin and about 5000 degrees Kelvin, and, in other embodiments, about 2700 or 3500 degrees Kelvin. Also, at least some of the luminaires disclosed herein preferably exhibit an efficacy of at least about 80 lumens per watt, more preferably at least about 100, and most preferably 120 lumens per watt. Further, in some embodiments, the waveguide or waveguides exhibit an optical efficiency of at least about 80 percent, preferably, at least 90 percent, and most preferably, at least about 95 percent. Further, at least some of the luminaires disclosed herein preferably exhibit an overall efficiency (i.e., light extracted out of the waveguide divided by light injected into the waveguide) of at least about 70 percent, preferably, at least about 80 percent, and most preferably, at least about 90 percent. A color rendition index (CRI) of at least about 80 is preferably attained by at least some of the luminaires disclosed herein, with a CRI of at least about 88 being more preferable, and at least about 90 being most preferable. Some luminaires exhibit a CRI of at least about 90 while maintaining a relatively high efficiency. Any desired particular output light distribution, such as a butterfly light distribution, could be achieved, including up and down light distributions or up only or down only distributions, etc.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the embodiments described herein, light is coupled into the optic, where primarily TIR is used for re-direction and collimation. This coupling allows the full range of angular emission from the source, including high-angle light, to be re-directed and collimated, resulting in higher optical efficiency in a more compact form factor. One example of a waveguide having a high efficiency in a compact form factor is described in U.S. patent application Ser. No. 13/839,949, filed Mar. 15, 2013, entitled "Optical Waveguide and Lamp Including Same".

In at least some of the present embodiments, the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the embodiments are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure. No language in the specification should be construed as indicating any element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:
1. A display lighting element for viewing of an object disposed therein, comprising:
   a luminaire comprising:
      a transparent optical waveguide comprising a primary light-emitting surface and a secondary surface opposite the primary light-emitting surface;
      a light source coupled to the transparent optical waveguide; and a plurality of light extraction features disposed on the primary light-emitting surface; and wherein the plurality of light extraction features comprises a first portion adjacent to the primary light-emitting surface and a second portion distal from the primary light-emitting surface, wherein the first portion comprises a truncated hemispherical shape in cross section and the second portion comprises one of a truncated conical shape and a cylindrical shape in cross section such that the plurality of light extraction features develop a directional illumination distribution through the primary light-emitting surface in a direction away from the secondary surface onto the object displayed, a display case comprising a housing wherefrom the display lighting element is suspended;

wherein the object is viewable through the secondary surface and the primary light-emitting surface by a direct line-of-sight.

2. The display lighting element of claim 1, wherein the first portion is undercut relative to the primary light-emitting surface between an aperture adjacent the primary light-emitting surface and the second portion.

3. The display lighting element of claim 2, wherein the second portion is disposed between the first portion and a base opposite the aperture.

4. The display lighting element of claim 3, wherein the plurality of light extraction features comprises a first extraction feature comprising a first height and a second extraction feature comprising a second height different from the first height.

5. The display lighting element of claim 3, wherein the plurality of light extraction features comprises a first extraction feature comprising a first aperture diameter and a second extraction feature comprising a second aperture diameter different from the first aperture diameter.

6. The display lighting element of claim 3, wherein the plurality of light extraction features comprises a first extraction feature comprising a first base diameter and a second extraction feature comprising a second base diameter different from the first base diameter.

7. The display lighting element of claim 1, wherein at least about 90% of light is emitted from the primary light-emitting surface of the optical waveguide.

8. The display lighting element of claim 1, wherein at least about 95% of light is emitted from the primary light-emitting surface of the optical waveguide.

9. A luminaire, comprising:
a transparent optical waveguide comprising a primary light-emitting surface and a secondary surface opposite the primary light-emitting surface;
a light source coupled to the transparent optical waveguide;
a plurality of light extraction features disposed on the primary light-emitting surface; and
wherein the plurality of light extraction features comprises a first portion adjacent to the primary light-emitting surface and a second portion distal from the primary light-emitting surface, and wherein the first portion comprises a truncated hemispherical shape in cross section and the second portion comprises one of a truncated conical shape and a cylindrical shape in cross section such that light is directionally extracted from the primary light-emitting surface in a direction away from the secondary surface to illuminate a surrounding that is viewable through the transparent optical waveguide;

a housing wherefrom the luminaire is vertically suspended for providing general illumination lighting in a direction away from a viewer.

10. The luminaire of claim 9, wherein the light source is disposed within the housing, and wherein a coupling end of the transparent optical waveguide is disposed in the housing adjacent to the light source.

11. The luminaire of claim 10, wherein the first portion is undercut relative to the primary light-emitting surface between an aperture adjacent the primary light-emitting surface and the second portion.

12. The luminaire of claim 11, wherein the second portion is disposed between the first portion and a base opposite the aperture.

13. The luminaire of claim 12, wherein the plurality of light extraction features comprises a first extraction feature comprising a first height and a second extraction feature comprising a second height different from the first height.

14. The luminaire of claim 12, wherein the plurality of light extraction features comprises a height of between about 10 μm and about 500 μm.

15. The luminaire of claim 12, wherein the second portion comprises a height of between about 10 μm and about 100 μm.

16. The luminaire of claim 12, wherein the plurality of light extraction features is disposed in a hexagonal array.

17. A method of illumination using an optical waveguide comprising a primary light-emitting surface and a secondary surface opposite the primary light-emitting surface, the method comprising:
providing the optical waveguide;
injecting light into the optical waveguide; and
wherein the waveguide comprises a plurality of light extraction features that produce an illumination characteristic resulting from the plurality of extraction features directing light out of the optical waveguide away from the primary light-emitting surface;
wherein the plurality of light extraction features comprises a first portion adjacent to the primary light-emitting surface and a second portion distal from the primary light-emitting surface; and
wherein the first portion comprises a truncated hemispherical shape in cross section and the second portion comprises one of a truncated conical shape and a cylindrical shape in cross section;
directionally extracting light from the primary light-emitting surface through the plurality of light extraction features in a direction away from the secondary surface to direct light onto an object that is viewable through the secondary surface and the primary light-emitting surface.

18. A method of illumination using an optical waveguide comprising a primary light-emitting surface and a secondary surface opposite the primary light-emitting surface, the method comprising:
providing the optical waveguide;
disposing a plurality of light extraction features onto the primary light-emitting surface, the plurality of light extraction features comprising a first portion adjacent to the primary light-emitting surface and a second portion distal from the primary light-emitting surface, wherein the first portion comprises a truncated hemispherical shape in cross section and the second portion comprises one of a truncated conical shape and a cylindrical shape in cross section;

injecting light into the optical waveguide;
arranging a light source within a housing;
mounting the optical waveguide on the housing wherein a coupling end of the optical waveguide is disposed in the housing adjacent to the light source; and
directionally extracting light from the primary light-emitting surface through the plurality of light extraction features in a direction away from the secondary surface to direct at least 95% of the injected light out of the optical waveguide and onto an object that is viewable through the secondary surface and the primary light-emitting surface.

19. The method of claim 18, wherein the disposing comprises disposing the plurality of light extraction features in a hexagonal array.

* * * * *